US012221922B2

(12) United States Patent
Tian et al.

(10) Patent No.: US 12,221,922 B2
(45) Date of Patent: Feb. 11, 2025

(54) ORGANIC RANKINE CYCLE (ORC) POWER GENERATION SYSTEM UTILIZING LNG COLD ENERGY AND DUAL-FUEL MARINE ENGINE WASTE HEAT

(71) Applicant: Shanghai Maritime University, Shanghai (CN)

(72) Inventors: Zhen Tian, Shanghai (CN); Wenzhong Gao, Shanghai (CN); Yuan Zhang, Shanghai (CN); Leping Xu, Shanghai (CN)

(*) Notice: Subject to any disclaimer, the term of this patent is extended or adjusted under 35 U.S.C. 154(b) by 58 days.

(21) Appl. No.: 17/045,019

(22) PCT Filed: Jul. 2, 2019

(86) PCT No.: PCT/CN2019/094302

§ 371 (c)(1), (2) Date: Aug. 6, 2021

(87) PCT Pub. No.: WO2020/073698

PCT Pub. Date: Apr. 16, 2020

(65) Prior Publication Data

US 2024/0247610 A1 Jul. 25, 2024

(30) Foreign Application Priority Data

Oct. 11, 2018 (CN) ........................ 201811180495.5

(51) Int. Cl.
*F02C 1/05* (2006.01)

(52) U.S. Cl.
CPC ..................................... *F02C 1/05* (2013.01)

(58) Field of Classification Search
CPC ...... F02C 1/05; F02C 1/04; F02C 1/10; F02C 6/14; F02C 6/16; F02C 6/18; F02C 7/08;
(Continued)

(56) References Cited

U.S. PATENT DOCUMENTS 6,079,222 A * 6/2000 Fetescu ..................... F17C 9/04 62/915
2006/0222523 A1* 10/2006 Valentian .................. F17C 7/04 417/313

(Continued)

FOREIGN PATENT DOCUMENTS

CN 103362579 A * 10/2013
CN 203824151 U 9/2014

(Continued)

OTHER PUBLICATIONS

CN 103362579 (Year: 2024).*

*Primary Examiner* — Dapinder Singh
(74) *Attorney, Agent, or Firm* — Lei Jiang Esq.

(57) ABSTRACT

The present invention disclosed an Organic Rankine Cycle (ORC) power generation system utilizing LNG cold energy and dual-fuel marine engine waste heat. The ORC power generation system has a Liquified Natural Gas (LNG) loop, one or more ORC loop, and one or more waste heat recovery (WHR) loop. The LNG loop works as a heat sink, which provides cold energy for working medium condensation. The WHR loop, utilizing the waste heat from main engine jacket cooling water and engine exhaust gas, provides heat for working medium evaporation. The ORC loop may have a pump, a three-fluid heat exchanger, an expander, a power generator, a regenerator, a liquid-vapor separator, a liquid reservoir, a regulating valve, and an evaporator. A regenerator is arranged within the ORC loop between the expander and the three-fluid heat exchanger. The ORC loop may have one or more evaporator, which may recover the waste heat from main engine jacket cooling water and engine exhaust gas. The ORC loop utilizes the cold energy release by the LNG loop via the three-fluid heat exchanger. A bypass is set up in the ORC loop to adjust the working medium flow rate
(Continued)

via the expander. The ORC power generation system converts LNG cold energy and waste heat to electricity.

2 Claims, 4 Drawing Sheets

(58) Field of Classification Search
CPC .......... F01K 25/10; F01K 27/00; F01K 27/02; F01K 23/10; F01K 23/065; Y02E 10/46; Y02E 20/14; Y02E 60/14; Y02E 60/16
See application file for complete search history.

(56) References Cited

U.S. PATENT DOCUMENTS

2016/0109138 A1* 4/2016 Kang ...................... F01K 23/00 122/15.1
2018/0094550 A1* 4/2018 Conlon .................. F01K 23/18

FOREIGN PATENT DOCUMENTS

| | | |
|---|---|---|
| CN | 204154017 U | 2/2015 |
| CN | 106482414 A | 3/2017 |
| CN | 206094713 U | 4/2017 |
| CN | 110285636 A | 9/2019 |

* cited by examiner

ORGANIC RANKINE CYCLE (ORC) POWER GENERATION SYSTEM UTILIZING LNG COLD ENERGY AND DUAL-FUEL MARINE ENGINE WASTE HEAT

CROSS-REFERENCE TO RELATED APPLICATIONS

The subject application claims priority of the PCT application PCT/CN2018/078667 filed on Mar. 12, 2018, which claims priority of the Chinese invention application No. 201810108376.2 filed on Feb. 2, 2018 in China and patented on Sep. 13, 2019. The contents and subject matter of the PCT international application and Chinese priority application are incorporated herein by reference.

FIELD OF THE INVENTION

The present invention relates to the field of power engineering, referring to an LNG cold energy and industrial waste heat recovery system, and especially relates to an organic Rankine cycle (ORC) power generation system utilizing LNG cold energy and dual-fuel marine engine waste heat.

BACKGROUND OF THE INVENTION

The utilization of dual-fuel marine engine is widely promoted because of the International Maritime Organization's strict limit of pollutant emission. For convenience of storage and transportation, natural gas is kept in Liquified Natural Gas (LNG). LNG must be re-gasified before the dual-fuel marine engine could be used. The storage temperature of LNG is −162° C., while the required LNG temperature is generally above 20° C. Thus, a large amount of cold energy would be released during the re-gasification process, which could be up to 830 KJ/kg. At the same time, the dual-fuel marine engine would generate a large amount of waste heat, which is dispersed by Engine Exhaust Gas (EEG) and Jacket Cooling Water (JCW). The Organic Rankine Cycle (ORC) is able to use the cold energy and waste heat by converting them into electricity.

The Chinese invention patent CN 107605555A discloses a power generation system coupled with two ORC loops, wherein the system thermal efficiency is improved by recovering the waste heat of the expander exhaust steam. The heat source involved in the system is industrial waste heat at medium and low temperature, however, the character of the cold source is not defined. The cold energy utilization of LNG is not involved.

As described in U.S. Pat. No. 7,574,856B2, a two-stage ORC power generation system based on LNG cold energy utilization is disclosed, wherein LNG flows through the first-stage ORC loop and the second-stage ORC loop successively to provide cold energy for working medium condensation. In particular, a regenerator is set in front of the evaporator in the first-stage ORC loop to make full use of the working medium heat of the expander outlet. Although the system considers the full use of energy, the two-stage ORC power generation system has a complex structure with the cycle efficiency thereof affecting each other. Moreover, the thermal stress caused by the large temperature difference between LNG and the circulation working medium is not considered.

Therefore, it is necessary to provide an efficient ORC power generation system that can solve the above technical problems and is suitable for LNG cold energy and waste heat recovery. The single-stage ORC power generation system has limitations. Considering the thermal physical stability of the working medium, it is not easy to select proper working medium when the heat sink with ultra-low temperature. In addition, the large temperature difference between working medium and heat sources would lead to large irreversible loss and low system efficiency. Accordingly, there is a need in the art for a dual-fuel marine engine and ORC system that overcome the limitations. It is believed that ORC power generation system with regenerator could reduce the irreversible loss and improve the thermoelectric conversion efficiency.

SUMMARY OF INVENTION

The present invention provides an ORC power generation system for a dual-fuel marine engine waste heat and LNG cold energy recovery using the ORC power generation system, as well a method therefor. In particular, the ORC power generation system comprises at least one three-fluid heat exchanger and at least one regenerator. Various aspects of the present invention described herein may be applied to any of the particular applications set for other types of the waste heat utilization systems. The present invention may be applied as a standalone system or method, or as part of the application. It shall be understood that different aspects of the invention could be appreciated individually, collectively, or in combination with each other. The invention adopts the following technical scheme:

An Organic Rankine Cycle (ORC) power generation system having one stage recovers LNG cold energy and waste heat from a dual-fuel marine engine. The ORC power generation system is provided with an LNG loop, an ORC loop, and a JCW loop. The LNG loop is provided with an LNG storage tank, an LNG circulation pump, an LNG flow rate regulating valve, a three-fluid heat exchanger, an LNG vaporizer, and combustion chamber. The JCW loop is provided with a coolant circulating pump, a coolant cooler, an engine jacket, a coolant bypass valve, a dual-fuel marine engine, and an evaporator. The ORC loop is provided with an expander, a generator, a gas-liquid separator, a regenerator, a three-fluid heat exchanger, a working medium circulation pump, a liquid reservoir, and an evaporator. A bypass pipe parallel to the expander is set up in the ORC loop, and the mass flow rate of the working medium is controlled by the bypass valve based on the inlet and outlet pressure of the expander. The three-fluid heat exchanger is the condenser of the ORC loop, and the three-fluid heat exchanger is in wound tube type. The first fluid of the three-fluid heat exchanger is LNG, and the second fluid and the third fluid are working medium. The working medium flows through the three-fluid heat exchanger twice. The regenerator and evaporator are plate heat exchangers. In the regenerator, heat exchange is conducted between the working medium with high-temperature and low-pressure and the working medium with low-temperature and high-pressure. In the evaporator, the coolant in the industrial waste heat loop exchanges heat with the working medium with low-temperature and high-pressure that comes from the regenerator. The working medium of the ORC loop is a mixture of methane, ethane, and propane.

The LNG loop works as a heat sink, which provides the cold energy for working medium condensation. At the same time, LNG absorbs the heat released by the working medium and is re-gasified to natural gas for the dual-fuel marine engine. A vaporizer is installed in the LNG loop to adjust working load required by the dual-fuel marine engine. JCW offering the waste heat for the WHR loop. The WHR loop works as a heat source, which supplies the heat for working medium evaporation. After that, the working medium vapor with high temperature and high pressure pushes the expander to drive the power generator. Thus, thermal energy from the JCW loop and cold energy from LNG loop are converted into electricity. In addition, the WHR loop has an additional heat exchanger and a regulating valve for JCW cooling to guarantee the proper temperature for a dual-fuel marine engine. The working medium flows through the three-fluid heat exchanger twice, which could reduce the large temperature difference between the working medium and LNG. By adjusting the regulating valve, the mass flow rate through the expander could be controlled to match the ORC requirement. Alternatively, the EEG may serve the WHR loop as well. The selection of working medium in the ORC loop should consider the temperature ranges of heat sink and heat source.

An ORC power generation system having one coupled stage has a first evaporator and a second evaporator in series. The ORC loop includes a pump, a three-fluid heat exchanger, an expander, a power generator, a regenerator, a liquid-vapor separator, a liquid reservoir, a regulating valve, a first evaporator, and a second evaporator. The WHR loop has the JCW and the EEG as two heat sources. The temperature range of EEG (100~350° C.) is much higher than JCW (70~95° C.). Therefore, the working medium firstly absorbs the waste heat from the JCW and then from the EEG. The working medium flows successively through the first evaporator and the second evaporator. After that, the working medium become vapor with high temperature and high pressure. The working medium pushes the expander to drive the generator. Thus, the thermal energy is converted into electricity. The LNG loop works as a heat sink, which provides the cold energy for working medium condensation. At the same time, LNG turns into natural gas by absorbing heat released by the working medium and enters the dual-fuel marine engine. In addition, the JCW cycle has an additional heat exchanger and a bypass valve for JCW cooling to guarantee the proper temperature for a dual-fuel marine engine. The EEG cycle has a bypass valve for EEG temperature control. The selection of working medium in the ORC loop should consider the temperature ranges of heat sink and heat sources. The working medium of the ORC loop is a mixture of methane, ethane, and propane.

An ORC power generation system having two stages has a Low Temperature ORC (LTORC) loop and a high temperature ORC (HTORC) loop. Either the LTORC loop or the HTORC includes a pump, a three-fluid heat exchanger, an expander, a power generator, a regenerator, a liquid-vapor separator, a liquid reservoir, a regulating valve, and an evaporator. The LTORC and the HTORC are arranged in parallel and utilize the waste heat from JCW and EEG, respectively. The temperature range of EEG (100~350° C.) is much higher than JCW (70~95° C.). Therefore, JCW and EEG work as the heat source for LTORC and HTORC, respectively. The LNG loop works as a heat sink, which provides the cold energy for working medium condensation. The LNG flows through the three-fluid heat exchangers in the LTORC and that in the HTORC in turn. After absorbing the heat from working medium in the LTORC and HTORC, LNG is vaporized to natural gas and enters the dual-fuel marine engine. The selection of working mediums in the LTORC loop and the HTORC loop should consider the temperature ranges of heat sink and heat source. Therefore, the working mediums in the LTORC and the HTORC are different fluids. To guarantee the proper JCW temperature range, a bypass valve and an additional heat exchanger are installed in the JCW loop. In the EEG loop, a bypass valve is installed to adjust the mass flow rate of EEG and satisfy the heat demand of the HTORC loop.

The present invention has the following advantages: 1. The present invention makes full use of the high-grade cold energy released in the LNG regasification process and dual-fuel marine engine waste heat, and the cold and heat energy are converted into electricity through the ORC power generation system. Consequently, heat pollution is alleviated, energy efficiency is improved and thus the operation cost of LNG is reduced. 2. A regenerator is adopted to preheat the working medium before entering the evaporator by using the working medium heat at the expander outlet, which not only improves the evaporation temperature of ORC loop but also reduces the working load of the evaporator; the overall efficiency of the ORC power generation system could be accordingly improved. 3. The three-fluid heat exchanger is used as the condenser of the ORC power generation system, in which LNG flows through the three-fluid heat exchanger for heat exchange with working medium; in the three-fluid heat exchanger, the LNG after absorbing heat is converted into natural gas to satisfy the demand of end-users and the working medium after releasing heat is condensed into saturated liquid; in particular, the working medium flows through the three-fluid heat exchanger twice, and the temperature on each cross-section of the three-fluid heat exchanger is consistent, which eliminates the thermal stress caused by the large temperature difference and ensures the operation safety of the heat exchanger; meanwhile, the load of the evaporator in the ORC loop is reduced, and the efficiency of the ORC power generation system is further improved. 4. The mixture of methane, ethane, and propane is used as the working medium; by adjusting the proportion of each component, the condensation curve of working medium could match the regasification curve of LNG, thereby reducing the irreversible loss in the heat exchange process and improving the efficiency of ORC power generation system.

BRIEF DESCRIPTION OF THE DRAWINGS

The above-mentioned and other features of embodiments of the ORC power generation system having at least one stage, and the manner of their working, will be better understood in combination with the accompanying drawings.

DETAILED DESCRIPTION OF A PREFERRED EMBODIMENT

The technical scheme of the present invention is further described in combination with the selected embodiments and the attached drawings.

Figure 1:
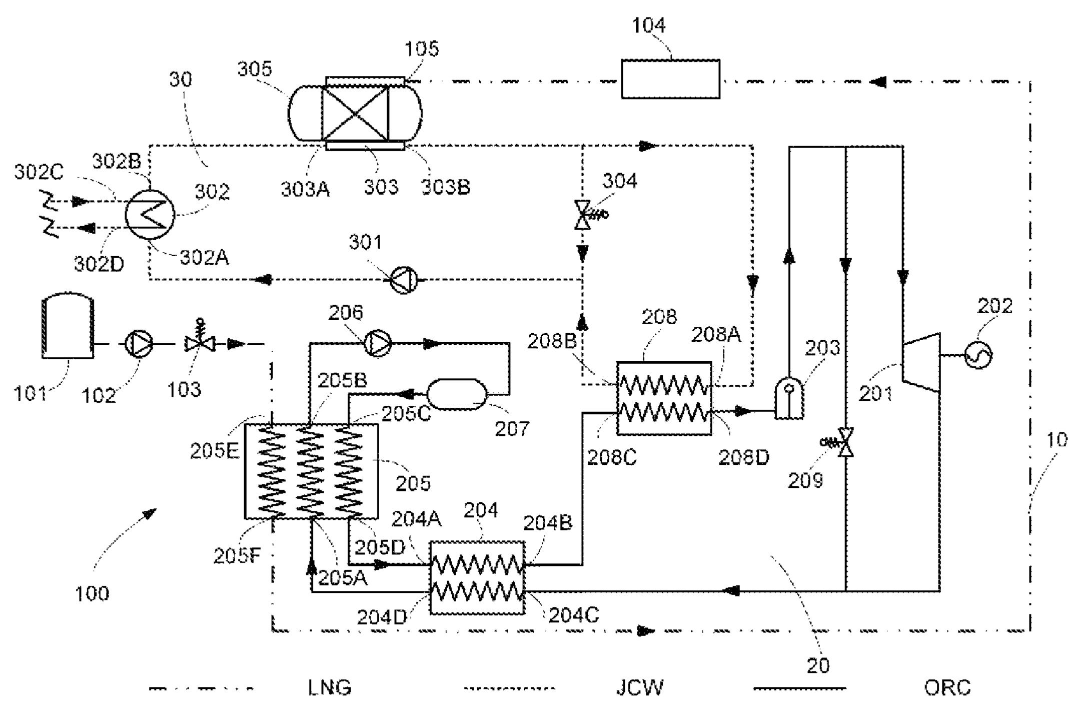
FIG. 1 is a graphical representation of an ORC power generation system of the present invention having one stage based on LNG cold energy and waste heat from a dual-fuel marine engine.

Referring now to FIG. 1, a graphical representation of an Organic Rankine Cycle (ORC) power generation system 100 recovering LNG cold energy and waste heat from a dual-fuel marine engine is shown. The ORC power generation system 100 is provided with an LNG loop 10, an ORC loop 20, and a JCW loop 30. The LNG loop is provided with an LNG storage tank 101, an LNG circulation pump 102, an LNG flow rate regulating valve 103, a three-fluid heat exchanger 205, an LNG vaporizer 104, and combustion chamber 105. The ORC loop is provided with an expander 201, a generator 202, a gas-liquid separator 203, a regenerator 204, a three-fluid heat exchanger 205, a working medium circulation pump 206, a liquid reservoir 207, and an evaporator 208. The JCW loop is provided with a coolant circulating pump 301, a coolant cooler 302, an engine jacket 303, a coolant bypass valve 304, a dual-fuel marine engine 305, and an evaporator 208.

In the ORC loop 20, the working medium becomes saturated or superheated vapor state with low pressure after the expander 201 and enters the regenerator 204 via the working medium inlet 204C to the working medium outlet 204D. Then, the working medium flows through the three-fluid heat exchanger 205 twice via the working medium inlet 205A and the working medium inlet 205C. During the process, the working medium exchanges heat with the LNG, and then enters the three-fluid heat exchanger 205 via the LNG inlet 205E. The working medium in liquid phase is pressurized by the working medium circulation pump 206 and enters the liquid reservoir 207. After that, the working medium flows from the working medium inlet 205C to the working medium outlet 205D. The function of the three-fluid heat exchanger would be discussed later. The working medium becomes superheated vapor by absorbing heat from the JCW loop 30 via the evaporator 208. The superheated working medium pushes the expander 201 to drive the generator 202 to generate electricity. Thus, the working medium completes the circulation process.

In the LNG loop 10, LNG in the LNG storage tank 101 is pressurized by the LNG circulation pump 102. The LNG mass flow rate is controlled by the LNG flow rate regulating valve 103 to meet the demand of the dual-fuel marine engine 305. In the three-fluid heat exchanger 205, LNG absorbs the heat from the working medium and becomes vapor state. The LNG vaporizer 104 is used to adjust the heating load. The LNG vaporizer 104 supplies extra heat and adjust the natural gas temperature to the proper range. After that, natural gas enters the combustion chamber 105.

In the JCW loop 30, the waste heat generated by the dual-fuel marine engine 305 is released via the engine jacket 303 to the jacket water. The jacket water is pumped by the coolant circulating pump 301. The jacket water carries waste heat to the evaporator 208 and releases to the working medium. The coolant bypass valve 304 could control the jacket water mass flow rate through the evaporator 208. The coolant cooler 302 is used to control the jacket water temperature. The jacket water enters from the coolant inlet 302A to the coolant outlet 302B. The other fluid enters the coolant cooler 302 via 302C and leaves via 302D.

Figure 2:
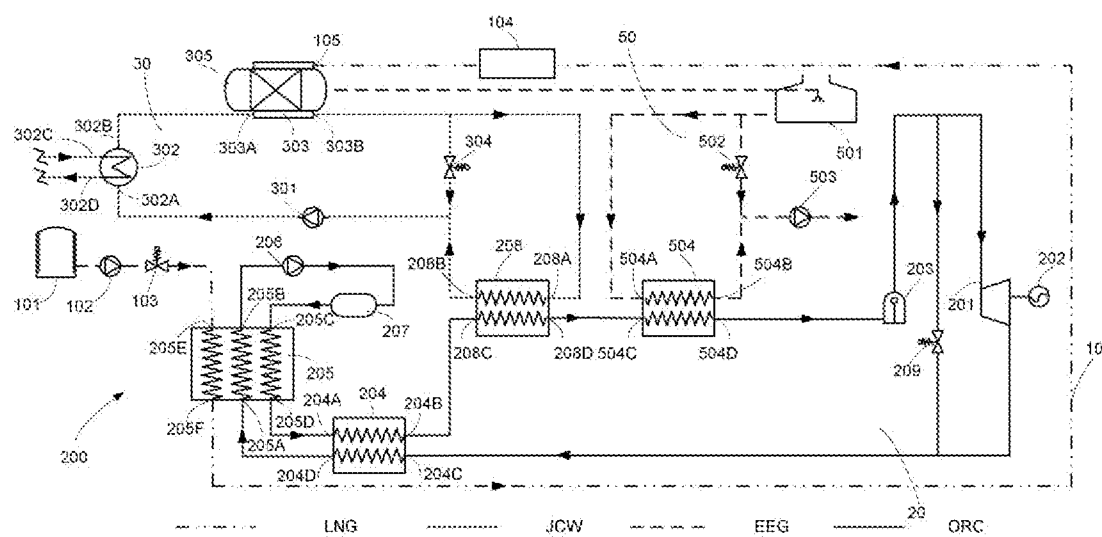
FIG. 2 is a graphical representation of an embodiment of an ORC power generation system of the present invention having one coupled stage, as described herein.

FIG. 2, a graphical representation of an embodiment of an ORC power generation system having a coupled stage 200 is shown. The ORC power generation system having a coupled stage 200 is provided with an LNG loop 10, an ORC loop 20, a JCW loop 30, and an EEG loop 50. The EEG loop 50 includes an exhaust gas scrubber 501, a bypass valve 502, an exhaust gas pump 503, and a second evaporator 504. In the EEG loop 50, the exhaust gas temperature after the exhaust gas scrubber 501 is around 300° C., which could supply waste heat for the working medium. The exhaust gas enters the second evaporator 504 and releases waste heat. The bypass valve 502 is used to adjust the exhaust gas mass flow rate for the second evaporator 504. The ORC power generation system having a coupled stage 200 comprises an evaporator 208 and a second evaporator 504. The JCW loop 30 provides the waste heat for the evaporator 208. The working medium enters and leaves the evaporator 208 from the working medium inlet 208C and the working medium outlet 208D, respectively. The waste heat from the JCW loop 30 is released in the evaporator 208 by entering and leaving the evaporator 208 from the coolant inlet 208A and the coolant outlet 208B. The EEG loop 50 provides the waste heat for the second evaporator 504. The waste heat from the EEG loop 50 is released in the second evaporator 504 by entering and leaving the second evaporator 504 from the coolant inlet 504A and the coolant outlet 504B. The working medium enters and leaves the second evaporator 504 from the working medium inlet 504C and the working medium outlet 504D, respectively. The working medium absorbs the waste heat from the JCW loop 30 and the EEG loop 50 and becomes superheated vapor, which pushes the expander 201. The expander 201 drives the generator 202 to produce electricity.

Figure 3:
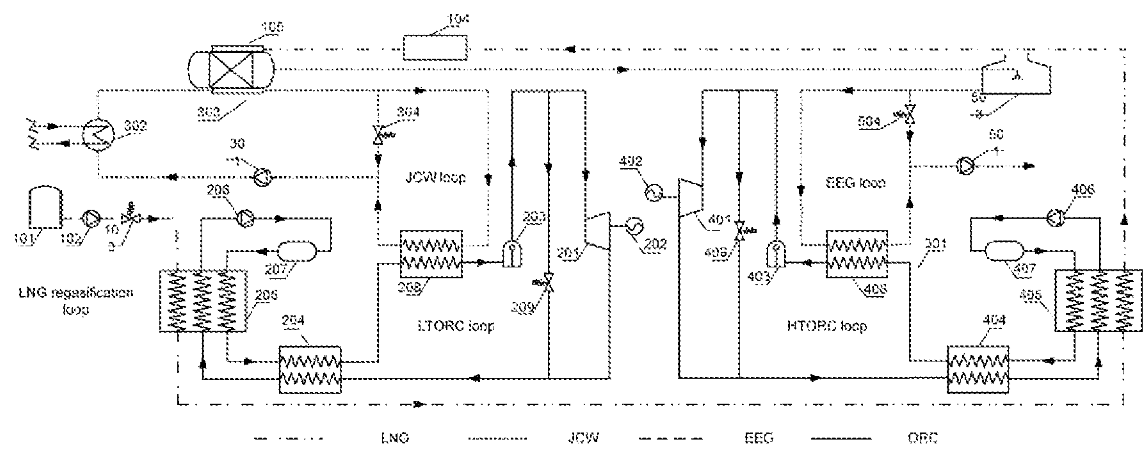
FIG. 3 is a graphical representation of an embodiment of an ORC power generation system of the present invention having two stages, as described herein.

FIG. 3, a graphical representation of an embodiment of an ORC power generation system having two stages 300 is shown. The ORC power generation system having two stages 300 differs from that shown in FIG. 2. The ORC power generation system having two stages 300 is provided with an LNG loop 10, a Low Temperature ORC (LTORC) loop 20, a JCW loop 30, a high temperature ORC (HTORC) loop 40, and an EEG loop 50. The HTORC loop 40 comprises of an HT expander 401, a HT generator 402, a HT gas-liquid separator 403, a HT regenerator 404, a HT three-fluid heat exchanger 405, a HT working medium circulation pump 406, a HT liquid reservoir 407, and a HT evaporator 408. The LTORC loop 20 and the HTORC loop 40 are arranged in parallel. The JCW loop 30 and the EEG loop 50 provides waste heat for the LTORC loop 20 and the HTORC loop 40, respectively. The LNG flows through the three-fluid heat exchanger 205 and the HT three-fluid heat exchanger 405. The working medium in the LTORC should be selected according to the temperature range of the JCW loop 30 and the temperature range of the LNG in the three-fluid heat exchanger 205. The working medium in the HTORC should be selected according to the temperature range of the EEG loop 50 and the temperature range of the LNG in the HT three-fluid heat exchanger 405. The working medium in the HTORC loop 40 absorbs the waste heat released by the EEG loop 40 via the HT evaporator 408 and becomes superheated vapor. The bypass valve 409 adjusts the mass flow rate of the working medium in the HTORC loop 40. The working medium after the HT expander 401 still has high temperature. In order to recovery this part of heat, a HT regenerator 404 is installed between the HT three-fluid heat exchanger 405 and the HT evaporator 408. The working medium flows through the HT three-fluid heat exchanger 405 twice. The working medium enters the HT three-fluid heat exchanger 405 via the working medium inlet 405A and exchanges heat with LNG that enters from the LNG inlet 405E. Then, the working medium becomes liquid state and enters the HT working medium circulation pump 406 to the HT liquid reservoir 407. The liquid state working medium absorbs heat from the HT regenerator 404 and the HT evaporator 408 and becomes superheated vapor to push the HT expander 401.

Figure 4:
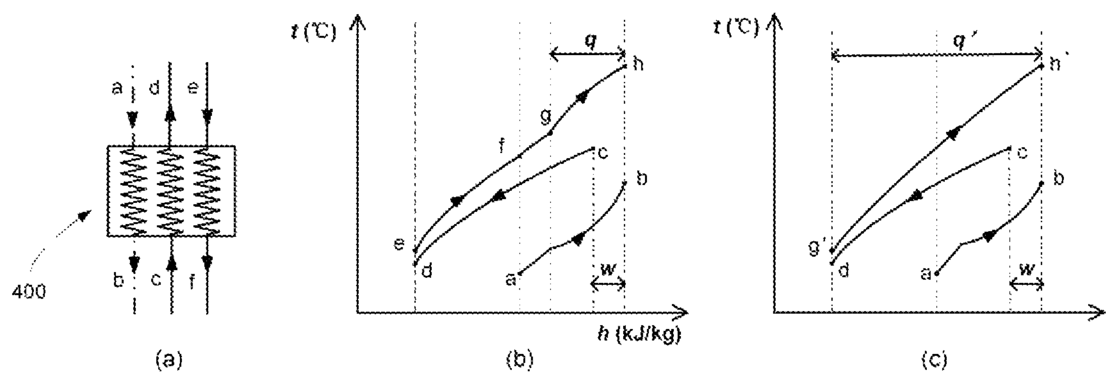
FIG. 4 is a graphical representation of the temperature-enthalpy (t-h) for the ORC power generation system of the present invention with a regenerator.

FIG. 4, a graphical representation of an embodiment of the working principle of a three-fluid heat exchanger 400 is shown. As shown in FIG. 4 (*a*), the working medium in the three-fluid heat exchanger are LNG, working medium, and working medium, respectively. Wherein, a is an inlet for LNG, b is an outlet for LNG, c is the first working medium inlet of the three-fluid heat exchanger, d is the first working medium outlet of the three-fluid heat exchanger, e is the second working medium inlet of the three-fluid heat exchanger, f is the second working medium outlet of the three-fluid heat exchanger, g is the working medium inlet of the evaporator, h is the working medium outlet of the evaporator, g' is the working medium inlet of the evaporator without regenerator, h' is the working medium outlet of the evaporator without regenerator. As shown in FIG. 4 (*b*), for the ORC power generation system with a regenerator, the working load of the evaporator is q, the output work of the expander is w, and the system efficiency is defined as w/q. As shown in FIG. 4 (*c*), for the ORC power generation system without a regenerator, the working load of the evaporator is q', the output work of the expander is w', and the system efficiency is defined as w/q'. On the premise that the output work of the expander is constant, the working load q is smaller than q'. Thus, the efficiency of the ORC power generation system with a regenerator could be improved.

What is claimed is:

1. An ORC power generation system with a regenerator for utilization of LNG cold energy and industrial waste heat, comprising an LNG regasification circuit, an ORC circuit, and an industrial waste heat circuit; wherein, the ORC circuit utilizes the LNG cold energy released by the LNG regasification circuit via a three-fluid heat exchanger and the regenerator, and the ORC circuit utilizes the industrial waste heat of the industrial waste heat circuit via an evaporator; the ORC circuit comprises an expander, an electric generator, a gas-liquid separator, the regenerator, the three-fluid heat exchanger, a working medium circulation pump, a liquid reservoir and the evaporator, which are connected successively in that order and form a closed cycle; a temperature sensor and a pressure sensor are both installed at an inlet and an outlet of the expander; an exhaust steam of the expander enters the regenerator for precooling and then enters the three-fluid heat exchanger for primary condensation; a working medium that has been primarily condensed is pressurized by the working medium circulation pump and then enters the liquid reservoir; the working medium in turn enters the three-fluid heat exchanger, the regenerator and the evaporator and becomes high-temperature and high-pressure steam, which pushes the expander to drive the generator and thus converting mechanical energy into electricity; a bypass pipe parallel to the expander is set up in the ORC circuit for controlling the mass flow rate of the working medium.

2. The ORC power generation system with the regenerator for utilization of LNG cold energy and industrial waste heat of claim 1, wherein the three-fluid heat exchanger is a condenser in wound tube type of the ORC circuit, with LNG as a first fluid of the three-fluid heat exchanger, and the ORC working medium as a second fluid and a third fluid thereof.

* * * * *